Dec. 23, 1947.  J. McCAUGHEY  2,433,140
NUT APPLICATOR
Filed Dec. 8, 1945  2 Sheets-Sheet 1

Inventor,
Joseph McCaughey,
by J. Stuart Freeman,
Attorney.

Dec. 23, 1947.  J. McCAUGHEY  2,433,140
NUT APPLICATOR
Filed Dec. 8, 1945  2 Sheets-Sheet 2

Inventor,
Joseph McCaughey,
by J. Stuart Freeman
Attorney.

Patented Dec. 23, 1947

2,433,140

UNITED STATES PATENT OFFICE 2,433,140

NUT APPLICATOR

Joseph McCaughey, Philadelphia, Pa., assignor to Abbotts Dairies, Incorporated, Philadelphia, Pa., a corporation of Maryland Application December 8, 1945, Serial No. 633,761

6 Claims. (Cl. 107—1)

The object of the invention specifically is to provide improvements in devices used for applying nuts, especially in coarsely comminuted form, to the surfaces of ice cream blocks, but substances other than ice cream and nuts may be handled by it. Furthermore, although various shapes and sizes of blocks may be coated with nuts and possibly other substances in a device of this character, the apparatus herein described is primarily designed for coating blocks of cylindrical shape, and the invention is to be considered in its broadest concept, regardless of shape, size or material that is to be coated, or that comprises the coating.

Another and more specific object is to provide a hopper having a bottom opening, a guide tube supported with and spaced from the walls of and discharging into said hopper in alignment with said opening, a plunger to force a block of ice cream or other substance to be coated through said tube and also through and from said opening, and oscillatable means to stir ground nuts or other coating substance such as ground chocolate, within said hopper and especially between said opening and the adjacent end of said tube, said stirring means preferably operating in synchronism with said plunger.

A further object is to provide a device of this character in which the guide tube is jacketed and provided with tap water pipe connections, so that its temperature is maintained above the freezing point, since in the case of ice cream the material passing through said tube will usually be approximately the same temperature as that of the hardening room, or about 20° F. Relative warming of said tube prevents the ice-cream blocks from sticking in said tube, by slightly tempering the surface of each block and thereby causing the softened surface of the block to serve as a lubricant, while a softened surface more readily receives and adheres to the ground nuts as other coating material, as the block passes through such material between the lower end of said tube and the opening in said hopper, following which the internal cold of said block re-freezes its tempered surface, to thereafter secure the nut, chocolate, or other particles, in firm adherence to it.

Figure 1:
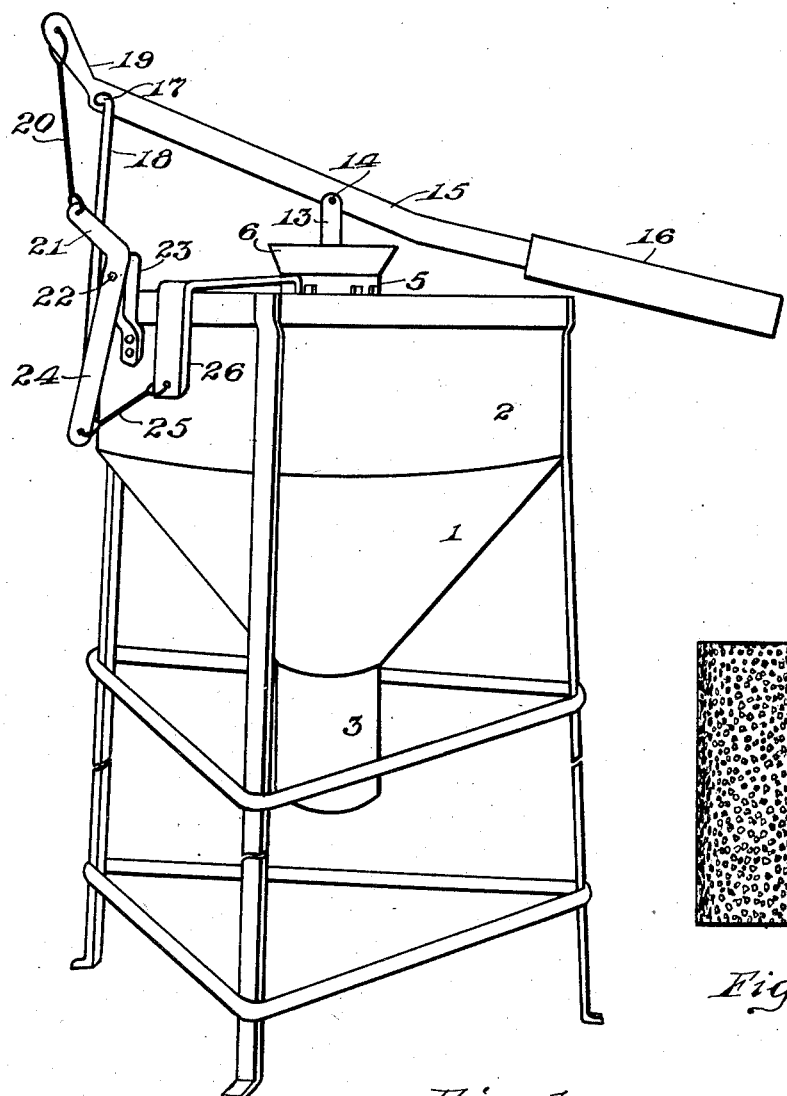
Figure 7:
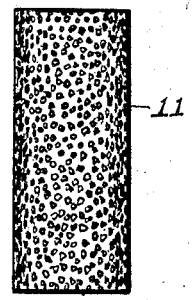
Figure 2:
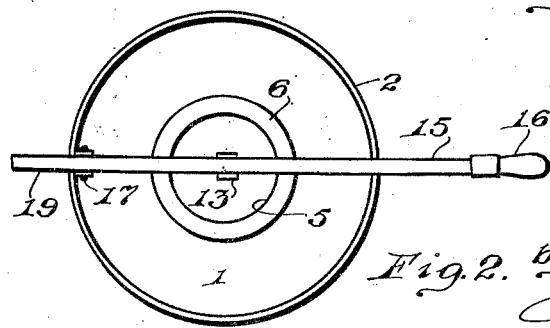
Figure 3:
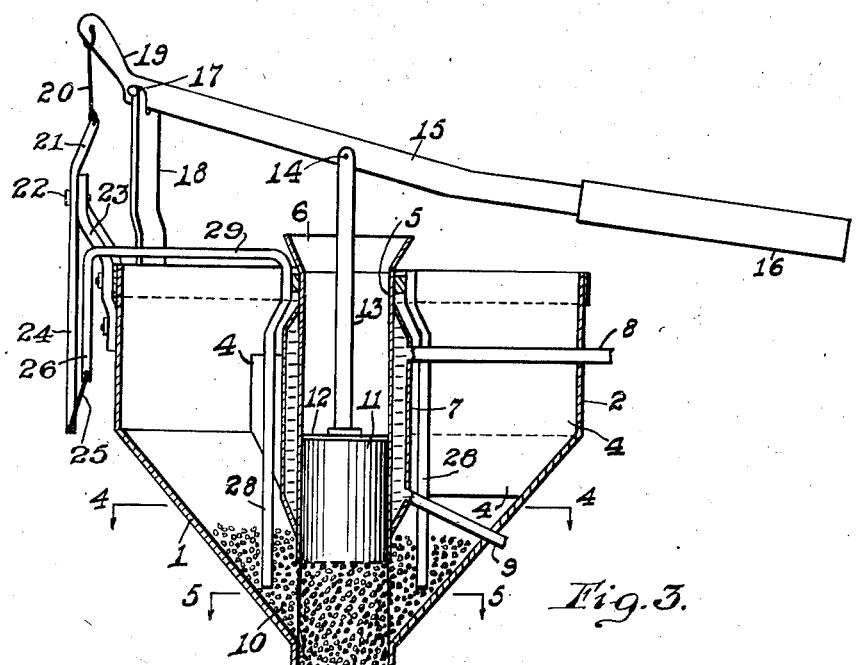
Figures 4, 5, 6:
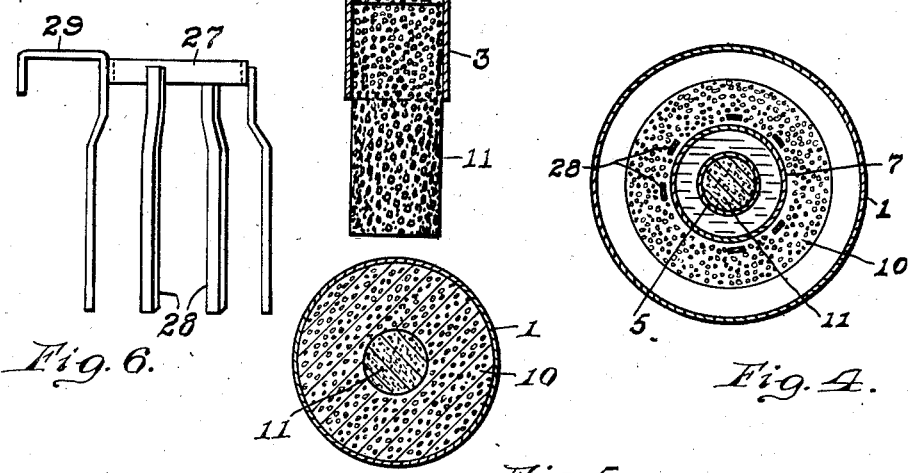

With the objects thus broadly stated, the invention comprises further details of construction and operation, which are hereinafter fully brought out in the following description, when read in conjunction with the accompanying drawings, in which Fig. 1 is a perspective view showing one embodiment of the invention; Fig. 2 is a plan view of the hopper and a plunger-actuating lever mounted thereabove; Fig. 3 is a vertical section through the device, omitting the stand by which the device is supported; Fig. 4 is a section represented by the line 4—4 of Fig. 3; Fig. 5 is a section represented by the line 5—5 of Fig. 3; Fig. 6 is a detailed view of the stirrer element per se; and Fig. 7 is an elevational view of ice cream block of cylindrical shape coated with nuts or similar edible coating.

Referring to the drawings, one embodiment of the invention comprises an intermediate inverted conical hopper section 1, upon which is superimposed a cylindrical section 2, while from said first-mentioned section there depends a smaller cylindrical discharge section 3. Within said intermediate and top sections a plurality of radially extending vanes 4 centrally position and support in axial alignment with said hopper a vertical tube 5, having a conical, upwardly directed receiving end 6, while the lower end of said tube terminates in spaced relation with the lower portion of said intermediate hopper section.

Surrounding a major portion of said tube is a water jacket 7, into and from which lead any suitably positioned intake and exhaust pipes 8 and 9 for the supply of tap water, that is not necessarily heated, though it might be in some instances, but is at a temperature above freezing, in order to temper, that is to soften, the surface of a sub-zero cylinder of ice cream, for example, passing through said tube. Such softening of the surface portion of an ice cream cylinder serves the dual purpose of preventing the same from sticking in the tube, and also makes it possible for said cylinder to pick up and carry with it a continuous coating of ground nut meats, chocolate, or the like 10, that surrounds the lower portion of the tube within the intermediate section of said hopper. Thus, in Fig. 3 an uncoated cylinder of ice cream 11 is shown as passing from said tube through the body of nut meats, or the like, which latter adhere to said cylinder from the lower end of said tube through the over or restricted outlet section 3 of said hopper. Finally, by reason of the intense cold of the body of said cylinder, said nut meats are caused to firmly adhere to and partially within the surface of said cylinder, after it leaves the discharge end of said hopper, as shown in Fig. 7.

In order to force a cylinder of ice cream through said tube, a plunger or piston 12 is provided upon the lower end of a rod 13, which projects freely from the upper end of said tube, and is pivotally connected at 14 to an intermediate portion of a lever 15, which if manually operated is provided with a handle 16, but which is preferably actuated by fluid pressure exerted through the medium of a steam or compressed air cylinder of conventional design and arrangement (not shown). For purposes of illustration, that end of said lever opposite to its handle is pivotally connected at 17 to a bracket 18 attached to the side of the upper hopper section 2, while an extension 19 of said lever is connected by a link 20 to one arm 21 of a bellcrank lever that is pivotally supported at 22 to a bracket 23 carried by the side of said hopper, the other arm 24 of said last-mentioned lever being connected by a link 25 to the angularly depending end portion of an arm 26, which extends radially outwardly from and is secured to a band 27, that slidably surrounds the upper end portion of the tube 5, between its upper end 6 and the water jacket 7. Said band in turn is provided with elongated, circumferentially spaced, depending fingers 28, which generally extend into that portion of the body of ground nut meats or the like in the region of the lower end of said tube, so as to prevent the ground particles from sticking together or packing, said fingers oscillating angularly about the axis of said tube and hopper as said plunger 12 reciprocates vertically within said tube and said band oscillates circumferentially.

Having thus described my invention, what I claim and desire to protect by Letters Patent of the United States is:

1. A device of the class described, comprising a hopper having a discharge opening, a guide tube within said hopper, the lower end of which tube terminates in spaced relation with said opening, a tempering jacket surrounding said tube within said hopper, and a piston reciprocatable within said tube to force a mass of ice cream through and into gathering contact with a coating substance within said hopper between the end of said tube and said hopper opening.

2. A device of the class described, comprising a hopper having a discharge opening, a guide tube within said hopper, the lower end of which tube terminates in spaced relation with said opening, the discharge end of said tube being less diameter than said opening, a tempering jacket surrounding said tube within said hopper, upwardly extending radial vanes supporting said tube axially with respect to said hopper, and a piston reciprocatable within said tube to force a mass of ice cream through and into gathering contact with a coating substance within said hopper between the end of said tube and said hopper opening.

3. A device of the class described, comprising a hopper having a discharge opening, a guide tube within and spaced from the walls of said hopper, the lower end of said tube terminating in spaced relation with said opening, a plunger reciprocatable within said tube, a stirring finger extending through the lower body portion of said hopper and terminating adjacent to the path of a body passing from said tube towards said hopper opening, and actuating means operative to simultaneously reciprocate said plunger and oscillate said finger about the axis of said tube.

4. A device of the class described, comprising a hopper having a discharge opening, a guide tube within and spaced from the walls of said hopper, the lower end of said tube terminating in spaced relation with said opening, a plunger reciprocatable within said tube, a collar rotatably mounted upon the upper portion of said tube, a plurality of stirring fingers carried by said collar and extending freely through the body portion of said hopper and terminating adjacent to the path of a body passing from said tube towards said hopper opening, and actuating means operative to simultaneously reciprocate said plunger and oscillate said collar and fingers.

5. A device of the class described, comprising a hopper having a discharge opening, a guide tube within and spaced from the walls of said hopper, the lower end of said tube terminating in spaced relation with said opening, a plunger reciprocatable within said tube, a stirring finger extending through the lower body portion of said hopper and terminating adjacent to the path of a body passing from said tube towards said hopper opening, and actuating means operative to simultaneously reciprocate said plunger and oscillate said finger about the axis of said tube, and a water jacket surrounding a major portion of said tube to temper the surface of a block of frozen material passing there through.

6. A device of the class described, comprising a hopper having a discharge opening, a guide tube within and spaced from the walls of said hopper, the lower end of said tube terminating in spaced relation with said opening, a plunger reciprocatable within said tube, a collar rotatably mounted upon the upper portion of said tube, a plurality of stirring fingers carried by said collar and extending freely through the body portion of said hopper and terminating adjacent to the path of a body passing from said tube towards said hopper opening, and actuating means operative to simultaneously reciprocate said plunger and oscillate said collar and fingers and a water jacket surrounding a major portion of said tube to temper the surface of a block of frozen material passing therethrough.

JOSEPH McCAUGHEY.

REFERENCES CITED

The following references are of record in the file of this patent:

UNITED STATES PATENTS

| Number | Name | Date |
|---|---|---|
| 573,432 | Megson | Dec. 15, 1896 |
| 1,353,386 | Erb | Sept. 21, 1920 |
| 1,513,781 | Yates | Nov. 4, 1924 |
| 2,214,325 | Gothe | Sept. 10, 1940 |
| 2,248,643 | Rasmusson | July 8, 1941 |